US006555012B1

(12) United States Patent
Fernholz et al.

(10) Patent No.: US 6,555,012 B1
(45) Date of Patent: Apr. 29, 2003

(54) METHOD AND COMPOSITION FOR THE TREATMENT OF BLACKWATER COLLECTION SYSTEMS

(75) Inventors: Peter J. Fernholz, Burnsville, MN (US); Don Southworth, Inver Grove Heights, MN (US); Victor F. Man, St. Paul, MN (US)

(73) Assignee: Ecolab Inc., St. Paul, MN (US)

( * ) Notice: Subject to any disclaimer, the term of this patent is extended or adjusted under 35 U.S.C. 154(b) by 0 days.

(21) Appl. No.: 09/676,616

(22) Filed: Oct. 2, 2000

(51) Int. Cl.[7] .............................. C02F 5/08; C23G 1/04; B08B 3/08; C11D 3/02; C11D 3/16
(52) U.S. Cl. ...................... 210/749; 510/191; 510/192; 510/247; 510/401; 134/22.14; 134/22.19; 134/166 R; 210/754
(58) Field of Search ................... 210/749, 754, 210/139, 205, 906, 907; 252/175, 180; 134/22.14, 22.19, 166 R, 184; 510/191, 192, 247, 401, 405

(56) References Cited

U.S. PATENT DOCUMENTS

| 2,858,939 A | | 11/1958 | Corliss |
| 2,974,800 A | | 3/1961 | Fleischmann |
| 3,733,617 A | | 5/1973 | Bennett |
| 3,883,303 A | | 5/1975 | Roberts |
| 3,953,352 A | * | 4/1976 | Mizutani et al. |
| 4,213,857 A | | 7/1980 | Ishida et al. |
| 4,216,027 A | * | 8/1980 | Wages |
| 4,229,408 A | * | 10/1980 | Bennett et al. |
| 4,619,710 A | | 10/1986 | Kuenn et al. |
| 4,802,990 A | * | 2/1989 | Inskeep, Jr. |
| 4,999,857 A | | 3/1991 | Mohrman |
| 5,013,442 A | | 5/1991 | Davis et al. |
| 5,094,752 A | | 3/1992 | Davis et al. |
| 5,336,398 A | | 8/1994 | Russell et al. |
| 5,352,365 A | | 10/1994 | Fuller |
| 5,374,356 A | | 12/1994 | Miller et al. |
| 5,389,283 A | * | 2/1995 | Held, III ..................... 134/40 |
| 5,520,803 A | | 5/1996 | Russell et al. |
| 5,542,981 A | * | 8/1996 | Lee, Sr. |
| 5,744,440 A | * | 4/1998 | Liu |
| 5,797,986 A | * | 8/1998 | Rolando et al. ............... 134/27 |
| 5,800,732 A | | 9/1998 | Coughlin et al. |
| 5,833,864 A | | 11/1998 | Miller et al. |
| 5,905,037 A | * | 5/1999 | Cooney, Jr. et al. |
| 5,928,514 A | | 7/1999 | Gothreaux |
| 6,042,742 A | * | 3/2000 | Whittemore et al. |
| 6,146,522 A | | 11/2000 | Fernholz et al. |
| 6,156,129 A | * | 12/2000 | Hlivka et al. .................. 134/42 |
| 6,268,324 B1 | * | 7/2001 | Besse et al. ................. 510/197 |
| 6,341,612 B1 | * | 1/2002 | Duckett et al. .......... 134/103.1 |

FOREIGN PATENT DOCUMENTS

| DE | 198 26 969 A1 | 12/1999 |
| EP | 0 807 695 A1 | 11/1997 |

* cited by examiner

Primary Examiner—Fred Prince
(74) Attorney, Agent, or Firm—Merchant & Gould P.C.

(57) ABSTRACT

A composition and method particularly designed to treat blackwater deposit. In at least one example, a composition for use in removing and preventing buildup of blackwater deposits in blackwater collection/treatment systems. The composition includes in the range of about 2 to about 15 wt. % of acidic solubilizing agent; in the range of about 0.2 to about 8 wt. % of wetting agent; in the range of about 0 to about 1 wt. % corrosion inhibitor; and a solvent/carrier medium. Another aspect is a concentrated composition to be diluted before or during use, the concentrated composition comprising in the range of about 10 to about 70 wt. % of acidic solubilizing agent; in the range of about 1 to about 40 wt. % of wetting agent; in the range of about 0 to about 5 wt. % corrosion inhibitor; and a solvent. In another example, a method for removing and preventing buildup of blackwater deposit in a blackwater collection system. In at least one example, the method includes: contacting at least a portion of the blackwater collection system with the blackwater deposit treatment composition above; and removing at least a portion of the treatment composition from the portion of the blackwater collection system.

30 Claims, 1 Drawing Sheet

METHOD AND COMPOSITION FOR THE TREATMENT OF BLACKWATER COLLECTION SYSTEMS

FIELD OF THE INVENTION

The invention relates generally to a method and a composition for the treatment of wastewater collection systems. More specifically, the invention relates to a method and a composition for removing and preventing buildup of blackwater deposit in a blackwater collection and/or treatment system typically used in large transportation systems.

BACKGROUND OF THE INVENTION

Waste collection and/or treatment systems are directed primarily to collecting and treating human waste. In many circumstances, such waste systems involve the use of high volumes of water to dilute the waste and move the waste through the system to a holding or treatment station. However, in some circumstances, the use of high volumes of water is impractical, or impossible. For example, waste collection/treatment systems on vehicles, such as ships, trains, aircraft, or other such vehicles pose difficulties. The water and waste are often stored within the vehicles until proper disposal can take place, thereby creating space and weight concerns. The use of high volumes of water are clearly impractical. In other situations, waste collection/treatment systems have to operate in areas having little or no access to water.

In such low water volume situations, the waste within the waste collection/treatment system is highly concentrated. Such highly concentrated, high solids content, low water volume waste is often referred to as low water (solvent) volume blackwater waste. One problem that arises in a low solvent volume system is that, due to the concentrated nature of the waste, a hardened deposit, known as blackwater deposit, can collect within the pipes and holding tanks of the system. Persistent problems arise with blackwater deposits reducing the capacity or clogging the system, especially in an entry port, narrower pipe sections and corner pipe sections.

In particular, the cruise ship industry has reported persistent problems with blackwater deposits in low water volume blackwater collection/treatment systems on cruise ships. The industry would often refer to the deposits as uric acid crystals, or "urine crystals", and would attempt to remove the deposits from the systems with hydrochloric acid (HCl), a strong acid. HCl would be dispersed into vacuum toilet Units of the shipboard systems, followed by repeated flushing. However, the use of HCl alone has had limited effectiveness on removing the blackwater deposits, and often resulted in serious corrosion of the mild steel which is often used in collection/treatment system vacuum lines.

Another problem involves the treatment of low water volume blackwater collection/treatment systems on vessels such as ships; trains or aircraft is that such vessels often have space constraints, thereby making it difficult to manually apply treatment compositions to the collection/treatment systems.

Therefore, there is a continuing need for a better composition and method for the treatment of blackwater deposit in blackwater collection/treatment systems.

SUMMARY OF THE INVENTION

The inventors have developed a composition and method particularly designed to treat problematic blackwater deposit. In at least one embodiment, the invention relates to a composition for use in removing and preventing buildup of blackwater deposits in blackwater collection/treatment systems. The composition includes in the range of about 2 to about 15 wt. % of acidic solubilizing agent; in the range of about 0.2 to about 8 wt. % of wetting agent; and in the range of about 0 to about 1 wt. % corrosion inhibitor; and a solvent/carrier medium.

In another embodiment, a concentrated composition is provided that can be diluted with additional solvent/carrier medium before or during use to provide for a use composition for use in removing and preventing buildup of blackwater deposits in blackwater collection/treatment systems. Generally, the concentrated composition, either during or prior to use, is diluted into a use composition having the concentration of components given above. The concentrated composition, which is used with a dilution scheme, includes in the range of about 10 to about 75 wt. % of acidic solubilizing agent; in the range of about 1 to about 40 wt. % of wetting agent; and in the range of about 0 to about 5 wt. % corrosion inhibitor; and the balance being a solvent/carrier medium.

In another aspect, the invention involves a method for removing and preventing buildup of blackwater deposit in a blackwater collection system. In at least one example, the method includes: contacting at least a portion of the black water collection system with the blackwater deposit treatment composition above; and removing at least a portion of the treatment composition from the portion of the blackwater collection system.

The features of novelty and various other advantages, which characterize the invention, are pointed out with particularly in the claims annexed hereto and forming a part hereof. For a better understanding of the invention, its advantages, and the objects obtained by its use, reference should be made to the following descriptive matter and drawing, in which there is described and depicted a preferred embodiment of the invention. However, before embodiments of the invention are explained in detail, it is to be understood that the invention is not limited in its application to the details of construction and arrangement of components set forth in the following description and drawing. The invention is capable of other embodiments and of being practiced or being carried out in various ways. Also, it is understood that the phraseology and terminology used in the description is for the purpose of description and should not be regarded as limiting.

DETAILED DESCRIPTION OF PREFERRED EMBODIMENTS

Figure 1:
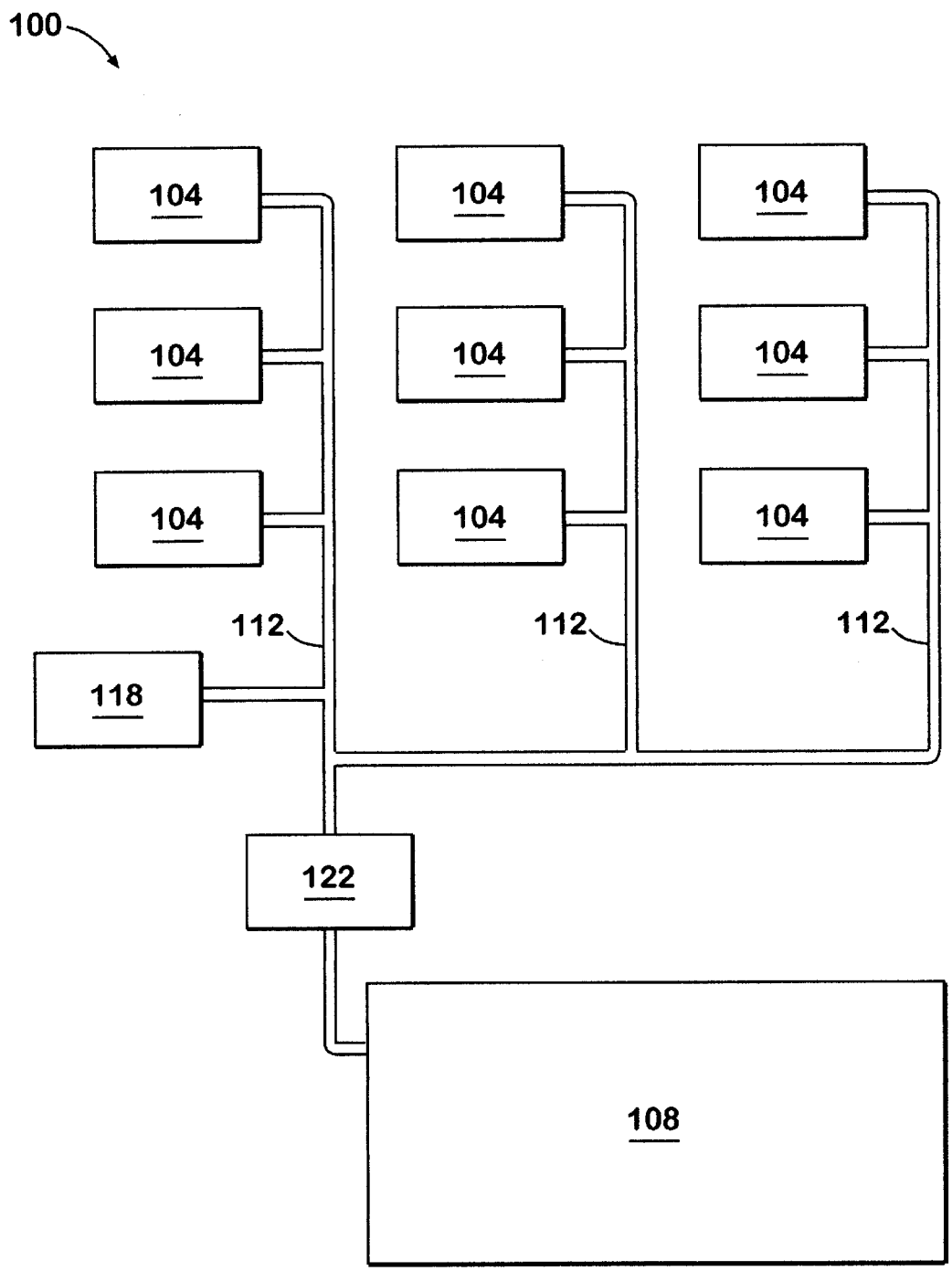
FIG. 1 shows one embodiment of a general blackwater collection/treatment system.

The following definitions are used herein, unless otherwise described:

"Blackwater" or "Blackwater waste" means sanitary wastewater collected from human waste disposal points, such as toilets or urinals. Low solvent volume blackwater waste refers to concentrated blackwater waste in a blackwater waste collection/treatment system using low volumes of water or other solvents. For example, most low solvent volume blackwater waste collection/treatment systems use in the range about 6 liters or less of solvent, such as water, per flush of a waste disposal point, such as a toilet or urinal. On marine vessels, blackwater is typically held in storage tanks for a period of time, disinfected to reduce the number of certain bacteria, and dumped in the open sea outside of territorial or harbor waters.

"Blackwater Deposit" means hardened deposit, which collects at various positions in low solvent volume blackwater waste collection/treatment systems due to the concentrated nature of the waste in such systems. Some examples of such deposit include high amounts of calcium phosphate contaminated with protein and fats from human waste. The chalky nature of the calcium phosphate scale coupled with contaminating fats and proteins make the blackwater deposit soil difficult to effectively penetrate and dissolve.

"Acidic Solubilizing Agent" means an acid composition that can comprise the capacity to reduce pH substantially below 7 and participate in the solubilizing action of calcium phosphate or other substantially inorganic soil components. The blackwater deposit material often contains solids derived from hardness components of water used in the waste systems. Hardness components are typically calcium, magnesium, iron, manganese and other di- or trivalent metal ions that can participate in deposit formation. The acidic solubilizing agent is an agent that can participate in the solubilization of such solid soil components. Preferred agents involve inorganic or organic acid materials that can have some capacity to solubilize the metal ion deposits. Preferred materials include acids that have moderate to weak acidity but also include some sequestering capacity. Examples of such solubilizing acids include hydroxyacetic acid, phosphoric acid, sulfamic acid, citric acid, and other similar acids including acid salts and mixtures thereof.

"Wetting Agent" means a surface active agent that, when added to an aqueous medium or solvent, causes it to penetrate more easily into, or to spread over the surface of, another material by reducing the surface tension of the solvent.

"Wt. %" as used herein refers to the percent by weight of a certain component in relation to a total composition, unless specifically stated otherwise.

The composition, method and system of the invention are particularly designed to effectively remove and prevent blackwater deposit. One particularly suitable use for the composition is in low solvent volume blackwater collection/treatment systems. In at least one example, the composition is adapted for use in blackwater collection/treatment systems in vehicles such as ships, trains, aircraft, or other such vehicles. The composition was specifically developed to treat blackwater collection/treatment systems of marine vessels, such as marine cruise ships, but, it should be understood that the composition would be useful in treating and preventing blackwater deposit in any blackwater waste collection/treatment system.

The inventors have found, through blackwater deposit analysis, that blackwater deposit has a unique composition and has unique characteristics compared to scale or other deposit found in high water volume waste collection/treatment systems. In particular, blackwater deposits are not primarily uric acid crystals, or "urine crystals", as is generally believed in the art. The inventors found that, in some examples, blackwater deposit is primarily calcium phosphate contaminated with protein and fats from human waste. The chalky nature of the calcium phosphate scale coupled with contaminating fats and proteins made it difficult to effectively penetrate and dissolve the blackwater deposit material. The hydrophobic nature of the fats acted to prevent the effectiveness of many known scale removing agents in penetrating and dissolving the blackwater deposits. The composition of the current invention was developed to form an appropriate acidic solubilizing agent/wetting agent system to penetrate and dissolve blackwater deposits. The composition is particularly useful, for example, in dissolving and preventing buildup of blackwater deposits, such as the calcium and magnesium phosphate scale contaminated with protein and fats, in low solvent volume blackwater treatment/collection systems. The composition for use generally includes acidic solubilizing agent, wetting agent, and optionally, corrosion inhibitor, all of which is dispersed in a solvent/carrier medium.

In some embodiments, a concentrated composition is provided that can be diluted with additional solvent/carrier medium before or during use to provide for a resulting use composition having effective use concentrations.

Acidic Solubilizing Agent

The acidic solubilizing agent component, in conjunction with the other components, acts to penetrate, dissolve, remove, and prevent blackwater deposit. Suitable acidic solubilizing agents of the composition include, for example, acids or mixtures of acids having a pKa of not more than about 4, and more preferably having a pKa in the range of about 0.9 to about 4.0. Examples of suitable acid solubilizing agents include carboxylic acids such as hydroxycarboxylic acids, sulfamic acid, or mixtures thereof. Examples of acceptable hydroxycarboxylic acids include hydroxyacetic acid, citric acid, lactic acid, and mixtures thereof. Examples of suitable carboxylic acids include acetic acid, and the like. It is preferred that the acidic solubilizing agent comprises at least some hydroxyacetic acid.

Particular examples of some suitable acidic solubilizing agents include a mixture of hydroxyacetic acid with sulfamic acid or citric acid. It has been found that such mixtures used as the acidic solubilizing agent provide for an improved treatment composition wherein recrystalization of blackwater deposit is less likely to occur. The ratio of hydroxyacetic acid to sulfamic acid or citric acid can range from about 20:1 to about 1:20. Preferably, the ratio is in the range of about 10:1 to 1:10, and more preferably, the ratio is about 10:1. In one suitable embodiment, the acidic solubilizing agent includes a mixture of hydroxyacetic acid with sulfamic acid, preferably in a ratio of about 10:1.

Mixtures of hydroxyacetic acid and sulfamic acid as the acidic solubilizing agent are preferred. It has been surprisingly found that when such mixtures are used as the solubilizing agent, and a corrosion inhibitor is included in the composition, the composition has very low corrosive activity as compared to compositions using other solubilizing agents combined with the same corrosion inhibitor.

Acidic solubilizing agent comprises in the range of about 2 to about 40 wt %, preferably in the range of about 6 to about 15 wt %, and most preferably in the range of about 8 to about 12 wt % of the total use composition.

In some examples of concentrated compositions, which are diluted before or during use, the acidic solubilizing agent generally comprises in the range of about 10 to about 75 wt %, preferably in the range of about 30 to about 70 wt %, and most preferably in the range of about 50 to about 65 wt % of the total concentrated composition.

Wetting Agents

The composition also includes wetting agent, which aids in allowing the acidic solubilizing agent to penetrate and dissolve blackwater deposit. It is particularly useful in aiding the penetration and dissolving of blackwater deposits including calcium and magnesium phosphate contaminated with protein and fats. Suitable wetting agents include, for example, most nonionic wetting agents generally known in the art, and mixtures thereof. Preferably, the wetting agent has low foam properties. Examples of some suitable wetting agents include the following: branched amine oxides, such as Barlox 12i; nonyl phenyl ethoxylates, such as NPE 6.5 and NPE 4.5; and $C_{12-13}$ alcohol ethoxycarboxylic acids, such as Neodox 23-4, and Neodox 23-1; Pluronic 25R2; SXS 40%; and mixtures thereof. A number of examples of wetting agents usable in the invention are listed in Table 1.

TABLE 1

| Product name/Trademark | Chemical makeup | Hydrophilic/ Lipophilic Balance (HLB) (if available) |
| --- | --- | --- |
| Barlox 12i | iso-alkyl amine oxide | 13 |
| NPE 6.5 | nonyl phenyl (6.5 moles) ethoxylate | 11.2 |
| NPE 4.5 | nonyl phenyl (4.5 moles) ethoxylate | 9.4 |
| Neodox 23-4 | $C_{12-13}$ alcohol (4 moles) ethoxycarboxylic acid | (not available) |
| Neodox 23-1 | $C_{12-13}$ alcohol (1 mole) ethoxycarboxylic acid | (not available) |
| Pluronic 25R2 | block copolymer of ethylene oxide and propylene oxide | 2 to 7 |
| SXS 40% | sodium xylene sulfonate | (not available) |
| Genapol UD050 | oxo alcohol ethoxylate | (not available) |
| Sandoxylate SX-412 | alcohol alkoxylate | 12 to 14 |
| Sandoxylate SX-408 | alcohol alkoxylate | 10 to 12 |

Wetting agent comprises in the range of about 0.2 to about 8 wt %, and preferably in the range of about 0.2 to about 2%, and more preferably in the range of about 0.2 to about 1% of the total use composition.

In some examples of concentrated compositions, which are diluted before or during use, the wetting agent generally comprises in the range of about 1 to about 40 wt %, and preferably in the range of about 1 to about 10%, and more preferably in the range of about 1 to about 5% of the total concentrated composition.

Corrosion Inhibitors

The composition may also include corrosion inhibitor. The corrosion inhibitor acts to prevent the corrosion of metal structures used in many waste systems. Examples of suitable corrosion inhibitors include those that inhibit corrosion, but that do not significantly interfere with the solubilizing activity of the composition. One particularly suitable corrosion inhibitor is Rodine 103, which is a liquid, cationic acid inhibitor designed specifically for use in chemical cleaning operations where chloride-free acids such as citric, hydroxyacetic, and formic acids are used. Rodine 103 is commercially available from Henkel Corporation.

Corrosion inhibitor comprises in the range of about 0 to about 1 wt % of the total composition. More preferably, corrosion inhibitor comprises in the range of about 0.1 to about 1 wt %, and more preferably in the range of about 0.5 to about 1 wt. % of the total use composition.

In some examples of concentrated compositions, which are diluted before or during use, the corrosion inhibitor generally comprises in the range of about 0 to about 5 wt %, more preferably in the range of about 0.5 to about 2 wt %, and more preferably in the range of about 0.5 to about 1 wt. % of the total concentrated composition.

Solvent/Carrier Medium

The remainder of the blackwater deposit treatment composition comprises a solvent/carrier medium. Suitable solvents/carrier mediums include water and water soluble solvents generally known in the art. Suitable solvents include water and polyhydroxy liquids, such as ethylene glycol, propylene glycol, ethylene glycol ethers, propylene glycol ethers, and the like, and mixtures thereof. Water is preferred, and more preferably softened water.

As discussed generally above, and in further detail below, a concentrated precursors of the composition can be produced, wherein less solvent is present, thereby increasing the weight percent of the remaining components. Such concentrated precursor compositions are usable in waste systems using suitable solvents to flush waste into the system. The act of flushing the concentrated precursor of the composition into the system combines the concentrated precursor with the solvent, thereby diluting the concentrated precursor into the composition of the invention.

Method of Treatment

Another aspect of the invention includes a method for removing and preventing buildup of blackwater deposit in a blackwater collection/treatment systems. The method of this invention includes contacting at least a portion of the blackwater collection/treatment system with the blackwater treatment composition discussed above, and removing at least a portion of the treatment composition from the portion of the blackwater collection/treatment system. The treatment composition is preferably allowed to contact the system for a contact time sufficient to dissolve blackwater deposit from the system into the treatment composition. Preferably, the contact time is in the range of at least about 0.5 hours, but a contact time of less than 0.5 hours is usable.

The composition is generally contacted with portions of the waste system by adding the composition to the system through disposal or collection points, such as toilets or urinals. The amount of composition added to an individual disposal or collection point can vary, depending upon the size of the system, the length of the portion of the system being treated, the degree of deposit buildup, and other variables, such as cost and timing considerations.

In one example, the amount of composition added to each single disposal point is in the range of about ⅓ to about 3 liters. In one specific example, about 2.5 liter of the use composition would be dispersed into a collection site, such as a toilet or urinal, followed by one flush to contact the composition with the interior portions of the system. The composition is allowed a contact time, as discussed above, prior to use or additional flushing of the collection site. The subsequent flushing or use of the collection site removes at least a portion of the used treatment composition, including blackwater deposit.

Preferably, each collection site of a blackwater waste collection/treatment system, including toilets and urinals, would be treated once every four to six weeks, or roughly nine to ten times annually.

Compositions embodying the invention can be used on a wide variety of blackwater collection/treatment systems. Oftentimes, different systems use different amounts of water or other solvent to flush waste into the system. For example, some systems may use gravity or vacuum toilets or urinals that use no water or other solvents per flush. More commonly, however, systems use small amounts of solvent per flush. As discussed above, a concentrated precursor to the use composition can be produced in a concentrated form, taking into account the solvent that is used to flush the composition into the system. The volume of solvent added by the flush is counted as being part of the solvent component of the use composition. Therefore, the composition actually added to the system, including the additional solvent added by the flush, falls within the use ranges of component concentrations as discussed above. The degree of concentration of the precursor is dependent upon the amount of solvent added by the flush.

For example, in a system using no additional solvent to flush waste into the system, the composition added to the system would preferably have the wt. % of components of the use composition as discussed above. However, in a system using on average two liters of water per flush of a toilet, the non-solvent components of the composition would be concentrated prior to addition to the system to account for the additional two liters of water (solvent) that will be added to the composition when the toilet is flushed.

Preferably the method of treatment includes a "top down" type approach, wherein the portions of the treatment system most distant from the final destination of the waste (ex: the storage tank) are treated first, and the portions closest the final destination of the waste are treated last. For example, in a ship-board system having the waste storage tank on the lower deck, treatment would start at the upper decks, and work down to the lower decks. Such a system maximizes treatment of the piping and collection systems and maximizes chemical contact time.

Additionally, on larger systems, that have multiple zones of piping and collection systems, it is preferable to completely treat one zone at a time. For example, in a shipboard system having multiple vertical zones of blackwater piping and collection systems, it is preferable to treat each zone one at a time. Often it is preferable to schedule treatment for non-use periods, such as turnaround days in the cruise ship industry, to maximize chemical contact time prior to reuse.

Another aspect of the invention is the use of an apparatus for delivering the composition of the invention to the blackwater collection/treatment system. Such an apparatus can provide for a convenient method to deliver the treatment composition to the system. In many systems, the apparatus generally includes a mobile cart, or vehicle, and a pumping system for dispensing the composition. Preferably the mobile treatment system includes a cart mounted battery powered pumping system activated by remote control radio signal activated from a dispensing wand with signal receiver and relays located on the cart. A timer system controls the amount of product dispensed. Such a system is very useful, for example, in treating shipboard blackwater systems, because some ships have small entryways into cabins, and small size bathrooms. The treatment cart can remain in the hallway while the operator takes the dispensing want into the bathroom and dispenses the composition into the entry-point of the blackwater system.

Those of skill in the art and others, however, will understand that the composition of the invention can be delivered to the blackwater collection/treatment system in a vast number of ways, and that the invention is not limited to the method of delivery.

Blackwater Treatment System

The composition and method of the invention are generally usable on most known waste collection/treatment systems wherein blackwater waste is being produced, and blackwater deposit is potentially a problem. As discussed above, the composition and method are particularly adapted for treating blackwater waste collection/treatment systems on vehicles, such as ships, trains, aircraft, or other such vehicles.

The drawing shows a general illustration of a blackwater collection/ treatment system 100 adapted for low solvent volume operation and handling of low solvent volume blackwater waste. It should be understood that the blackwater collection/ treatment system 100 is being shown for illustrative purposes only, and that the composition and method of the invention are not limited for use on such a system.

The system 100 includes human waste disposal points 104, a storage tank 108, and a piping system 112 for conveying the waste from the disposal points 104 to the storage tank 108. The waste disposal points 104, for example, may be toilets, urinals or other such waste disposal points. Depending upon the type of system used, the disposal points 104 may include a solvent source (not shown), such as a water source, to aid in flushing waste into the system. Such solvent sources may include, for example water sources such as water tanks, water pipes, and other such structures generally known. The disposal points are typically low solvent volume disposal points, which, through the use low solvent volumes, produce low solvent volume blackwater waste. For example, most low solvent volume disposal points use in the range about 6 liters or less of solvent, such as water, per flush. In large systems, such as on some marine vessels, there are often hundreds of disposal points.

The piping system 112 is in fluid communication with the waste disposal points 104 and the storage tank 108, and passes the waste from the disposal points 104 to the storage tank 108. The storage tank 108 retains the waste until it can be treated, or properly disposed of. The size of the piping system 112 and the storage tank 108 may vary widely, depending upon the necessary volume and the intended use of the system. In large systems, such as on some marine vessels with a large number of disposal points multiple storage tanks and piping systems may be used, although this is not necessary. On marine vessels, blackwater is often held in storage tanks for a period of time, and then dumped in the open sea outside of territorial or harbor waters.

Although some systems may be purely gravity feed, the system 100 may optionally include a vacuum system 118 in fluid communication with the piping system 112 for placing at least a portion of the interior of the piping system under vacuum to enhance the low solvent volume flushing capability of the disposal points 104. The portion of the piping system under vacuum is substantially air tight to better maintain vacuum pressure within the system 100. The vacuum system 118 preferably allows for a reduction in the volume of solvent necessary for each flush of a waste disposal point because the waste contents of the disposal point are sucked into the piping system through the action of the vacuum upon flushing. The vacuum system 118 creates a vacuum within the piping system 112, such that the pressure within the piping system is below the atmospheric pressure exterior to the piping system, thereby creating suction when waste disposal points 104 are flushed. Preferably, the vacuum created within the piping system 112 is than about one PSI or more lower than the atmospheric pressure surrounding the piping system.

The system 100 may also optionally include a disinfectant system 122 in fluid communication with the piping system 112. Any disinfectant system generally known in the art for use in disinfecting blackwater waste may be used. In some embodiments, the disinfectant system adds disinfectant to the waste to reduce the number of certain bacteria within the waste prior to entry into the storage tank. One example of a suitable disinfecting agent is chlorine, which is added to the waste to kill certain bacteria, such as coliform bacteria, and dumped in the open sea outside of territorial or harbor waters.

The invention may be further clarified by reference to the following Examples, which serve to exemplify some of the embodiments, and not to limit the invention.

EXAMPLES

Example 1

Production of Compositions

Thirty one (31) examples of compositions embodying the invention were produced, and are shown below in Table 2.

Most of these example compositions represent concentrated compositions to be used with 1 to 5 dilutions. For example, 0.5 liters of the concentrated composition used with 2 liters of flushing water.

TABLE 2

Blackwater Treatment Composition Prototype Formulas

| Comp. # | Water, Soft | Hydroxyacetic Acid, 70% | Citric Acid, Anhydrous | Acetic Acid, Glacial | Sulfamic Acid | Barlox 12i | NPE 6.5 | Neodox 23-4 | Neodox 23-1 |
|---|---|---|---|---|---|---|---|---|---|
| 1 | 45.00 | 50.00 | — | — | — | 5.00 | — | — | — |
| 2 | 42.00 | 50.00 | — | — | — | 5.00 | 3.00 | — | — |
| 3 | 45.00 | 35.00 | — | 15.00 | — | 5.00 | — | — | — |
| 4 | 45.00 | 50.00 | — | — | — | 3.00 | — | 2.00 | — |
| 5 | 45.00 | 50.00 | — | — | — | 3.00 | — | — | 2.00 |
| 6 | 45.00 | 50.00 | — | — | — | 3.00 | — | — | — |
| 7 | 40.00 | 50.00 | — | 5.00 | — | 5.00 | — | — | — |
| 8 | 48.00 | 50.00 | — | — | — | 2.00 | — | — | — |
| 9 | 73.00 | 25.00 | — | — | — | 2.00 | — | — | — |
| 10 | 47.5 | 50.00 | — | — | — | 2.00 | 0.500 | — | — |
| 11 | 47.5 | 50.00 | — | — | — | 2.00 | — | — | — |
| 12 | 72.5 | 25.00 | — | — | — | 2.00 | 0.500 | — | — |
| 12 A | 72.1 | 25.00 | — | — | — | 2.00 | 0.500 | — | — |
| 13 | 47.5 | 25.00 | 25.00 | — | — | 2.00 | 0.500 | — | — |
| 14 | 72.8 | 25.00 | — | — | — | 2.00 | — | — | — |
| 15 | 29.93 | 63.70 | — | — | — | 5.096 | 1.274 | — | — |
| 15 A | 29.43 | 63.70 | — | — | — | 5.096 | 1.274 | — | — |
| 15 B | 29.43 | 63.70 | — | — | — | 5.096 | 1.274 | — | — |
| 16 | 29.93 | 31.85 | 31.85 | — | — | 5.096 | 1.274 | — | — |
| 16 A | 28.93 | 31.85 | 31.85 | — | — | 5.096 | 1.274 | — | — |
| 17 | 29.93 | 31.85 | — | — | 31.85 | 5.096 | 1.274 | — | — |
| 17 A | 28.93 | 31.85 | — | — | 31.85 | 5.096 | 1.274 | — | — |
| 18 | 29.93 | 53.70 | — | — | 10.00 | 5.096 | 1.274 | — | — |
| 18 A | 28.93 | 53.70 | — | — | 10.00 | 5.096 | 1.274 | — | — |
| 19 | 29.93 | 59.50 | — | — | 4.20 | 5.096 | 1.274 | — | — |
| 19 A | 28.93 | 59.50 | — | — | 4.20 | 5.096 | 1.274 | — | — |
| 20 | 29.93 | 59.50 | — | — | 4.20 | 5.096 | — | — | — |
| 20 A | 28.93 | 59.50 | — | — | 4.20 | 5.096 | — | — | — |
| 21 | 29.93 | 59.50 | — | — | 4.20 | 5.096 | — | — | — |
| 21 A | 28.93 | 59.50 | — | — | 4.20 | 5.096 | — | — | — |
| 22 | 29.93 | 59.50 | — | — | 4.20 | 5.096 | — | — | — |
| 23 | 28.93 | 59.50 | — | — | 4.20 | 5.096 | — | — | — |

| Comp. # | Pluronic 25R2 | NPE 4.5 | SXS, 40% | Hamposyl 0 | Rodine 103 | Genapol UD050 | Sandoxylate SX-412 | Sandoxylate SX-408 |
|---|---|---|---|---|---|---|---|---|
| 1 | — | — | — | — | — | | | |
| 2 | — | — | — | — | — | | | |
| 3 | — | — | — | — | — | | | |
| 4 | — | — | — | — | — | | | |
| 5 | — | — | — | — | — | | | |
| 6 | 2.00 | — | — | — | — | | | |
| 7 | — | — | — | — | — | | | |
| 8 | — | — | — | — | — | | | |
| 9 | — | — | — | — | — | | | |
| 10 | — | — | — | — | — | | | |
| 11 | — | 0.500 | — | — | — | | | |
| 12 | — | — | — | — | — | | | |
| 12 A | — | — | — | — | — | | | |
| 13 | — | — | — | — | — | | | |
| 14 | — | — | 0.200 | — | — | | | |
| 15 | — | — | — | — | — | | | |
| 15 A | — | — | — | — | 0.50 | | | |
| 15 B | — | — | — | 0.50 | — | | | |
| 16 | — | — | — | — | — | — | | |
| 16 A | — | — | — | — | 1.00 | — | | |

TABLE 2-continued

Blackwater Treatment Composition Prototype Formulas

| | | | | | | | |
|---|---|---|---|---|---|---|---|
| 17 | — | — | — | — | — | | |
| 17A | — | — | — | 1.00 | — | | |
| 18 | — | — | — | — | — | | |
| 18A | — | — | — | 1.00 | — | | |
| 19 | — | — | — | — | — | | |
| 19A | — | — | — | 1.00 | — | | |
| 20 | — | — | — | — | 1.274 | | |
| 20A | — | — | — | 1.00 | 1.274 | | |
| 21 | — | — | — | — | — | 1.274 | |
| 21A | — | — | — | 1.00 | — | 1.274 | |
| 22 | — | — | — | — | — | — | 1.274 |
| 23 | — | — | — | 1.00 | — | — | 1.274 |

Most of these formulas have been tested, with and without dilution, on calcium phosphate, struvite, and black water scale from the field. We have found that acidic products are by far better than alkaline products in dissolving these soils. Also, the use of a good wetting agent, such as those represented in our formulas, is useful in speeding the dissolution process of these highly hydrophobic and insoluble calcium salts/compounds. Most of our formulas achieved over 90% dissolution of the soils in a few minutes.

Example 2

Corrosion Testing of Specific Compositions

A number of the compositions produced in Example 1 were tested for corrosion properties using mild steel as the substrate. Specifically, the corrosion properties of compounds 15, 15A, 15B, 16, 16A, 19, and 19A of Example 1 were tested using mild steel 1018 as a substrate, and using the Test Method #30 outlined in ASTM, Vol. 3.02, G31 –72 and 3.02, G1–90. The results of the corrosion testing are shown in Table 3.

TABLE 3

Metal Corrosion Test Results

| Composition Tested | Average Wt. Loss (mg) | Adjusted Wt. Loss (Average Wt. Loss-Control Wt. Loss) | Corrosion Rate* (mils/yr) | Appearance |
|---|---|---|---|---|
| Control (Distilled Water) | 135.6 | — | — | Silver w/ gray and tan spots |
| 15 | 319.7 | 184.1 | 240.5 | Silver w/ Gray and Rust Spots |
| 15A | 405.1 | 269.5 | 352.1 | Silver w/ Gray and Rust Spots |
| 15B** | 323.8 | 188.2 | 245.9 | Silver w/ Gray and Rust Spots |
| 16 | 315.6 | 180.0 | 235.1 | Silver w/Tan Spots |
| 16A | 352.5 | 216.9 | 283.4 | Silver w/Tan and Rust Spots |
| 19 | 344.3 | 208.7 | 272.7 | Dark Gray and Tan Spots |
| 19A | 246.9 | 111.3 | 145.4 | Silver with Gray and Tan Spots |

*A corrosion rate in excess of 250 MPY indicates the product is considered corrosive to the specific metal by DOT and the UN Ordinarily carbon steels and cast irons are never used for hydrochloric acid service. Rapid corrosion occurs at pH 4 or 5 or below, particularly if appreciable solution velocities are involved. Aeration or oxidizing conditions result in destructive attack, even in very dilute solutions.

Our compositions are predominantly based on hydroxyacetic acid, and by nature are advantageously much less corrosive than competitive ones based on hydrochloric acid (HCl), even those that are heavily inhibited.

However, our corrosion tests on mild steel indicated that hydroxyacetic acid alone (example composition 15), or a combination of hydroxyacetic acid and citric acid (example composition 16) are on the borderline of being corrosive, while a combination of hydroxyacetic acid and sulfamic acid (example composition 19) is somewhat more corrosive. Therefore, the incorporation of a corrosion inhibitor was desired, especially one that is non-hazardous. One such corrosion inhibitor we have tried is Rodine 103 from Henkel Corporation, a liquid, cationic acid inhibitor.

We have surprisingly found that Rodine 103 is synergistic with a combination of hydroxyacetic acid and sulfamic acid, resulting in significantly improved corrosion inhibition, as exemplified by example composition 19A.

The above specification, examples and data provide a complete description of the manufacture and use of the composition of the invention. Since many embodiments of the invention can be made without departing from the spirit and scope of the invention, the invention resides in the claims hereinafter appended.

We claim:

1. A composition for use in removing and preventing buildup of blackwater deposit in a blackwater collection or treatment system, the composition comprising:

in the range of about 2 to about 15 wt. % of acidic solubilizing agent;

in the range of about 0.2 to about 8 wt. % of nonionic wetting agent;

corrosion inhibitor in an amount sufficient to prevent corrosion of the blackwater collection or treatment system by more than about 250 mils per year according to ASTM Test Method #30; and a solvent/carrier medium.

2. The composition of claim 1, wherein the acidic solubilizing agent comprises acid having a pKa of not more than about 4.

3. The composition of claim 2, wherein the acidic solubilizing agent comprises acid having a pKa in the range of about 0.9 to about 4.0.

4. The composition of claim 1, wherein the acidic solubilizing agent comprises hydroxycarboxylic acid, carboxylic acid, or mixtures thereof.

5. The composition of claim 4, wherein the acidic solubilizing agent is selected from the group consisting of hydroxyacetic acid, acetic acid, citric acid, lactic acid, and mixtures thereof.

6. The composition of claim 1, wherein the acidic solubilizing agent comprises hydroxyacetic acid.

7. The composition of claim 1, wherein the acidic solubilizing agent comprises a mixture of a hydroxycarboxylic acid and a second acid selected from the group consisting of sulfamic acid, citric acid and mixtures thereof.

8. The composition of claim 7, wherein the acidic solubilizing agent comprises a mixture of a hydroxyacetic acid and sulfamic acid.

9. The composition of claim 1, wherein the wetting agent is selected from the group consisting of: branched amine oxide, nonylphenyl alkoxylate, alcohol ethoxycarboxylic acid, block copolymer of ethylene oxide and propylene oxide, alcohol alkoxylate, and mixtures thereof.

10. The composition of claim 1, wherein the corrosion inhibitor comprises a cationic acid inhibitor.

11. The composition of claim 1, wherein the solvent is selected from water, ethylene glycol, propylene glycol, glycol ethers, and mixtures thereof.

12. A composition concentrate for use in removing and preventing buildup of blackwater deposit in a blackwater collection or treatment system, the composition concentrate comprising:

in the range of about 10 to about 75 wt. % of acidic solubilizing agent;

in the range of about 1 to about 40 wt. % of nonionic wetting agent;

corrosion inhibitor in an amount sufficient to prevent corrosion of the blackwater collection or treatment system by more than about 250 mils per year according to ASTM Test Method #30; and a solvent/carrier medium.

13. The composition of claim 12, wherein the acidic solubilizing agent comprises acid having a pKa of not more than about 4.

14. The composition of claim 12, wherein the acidic solubilizing agent comprises acid having a pKa in the range of about 0.9 to about 4.0.

15. The composition of claim 12, wherein the acidic solubilizing agent comprises hydroxycarboxylic acid, carboxylic acid, or mixtures thereof.

16. The composition of claim 12, wherein the acid solubilizing agent is selected from the group consisting of hydroxyacetic acid, acetic acid, citric acid, lactic acid, and mixtures thereof.

17. The composition of claim 12, wherein the acidic solubilizing agent comprises hydroxyacetic acid.

18. The composition of claim 12, wherein the acidic solubilizing agent comprises a mixture of a hydroxycarboxylic acid and a second acid selected from the group consisting of sulfamic acid, citric acid and mixtures thereof.

19. The composition of claim 12, wherein the acidic solubilizing agent comprises a mixture of a hydroxyacetic acid and sulfamic acid.

20. A method for removing and preventing buildup of blackwater deposit in a blackwater collection or treatment system, the method comprising:

contacting at least a portion of the blackwater collection system with a blackwater deposit treatment composition, the treatment composition comprising:

in the range of about 2 to about 15 wt. % of acidic solubilizing agent;

in the range of about 0.2 to about 8 wt. % of nonionic wetting agent;

corrosion inhibitor in an amount sufficient to prevent corrosion of the blackwater collection or treatment system by more than about 250 mils per year according to ASTM Test Method #30; and a solvent/carrier medium; and removing at least a portion of the treatment composition from the portion of the blackwater collection system.

21. The method of claim 20, wherein prior to the removing step, further including the step of allowing the treatment composition to contact the portion of the blackwater collection system for a contact time sufficient to dissolve blackwater deposit from the collection system into the treatment composition.

22. The method of claim 21, wherein the contact time is at least about 0.5 hours.

23. The method of claim 20, wherein the acidic solubilizing agent component comprises hydroxyacetic acid.

24. The method of claim 20, wherein the blackwater treatment system includes at least one vacuum toilet, and the contacting step includes dispensing the treatment composition into a toilet, and flushing the toilet.

25. The method of claim 24, wherein the dispensing step is performed by using a mobile treatment apparatus comprising:

a vehicle having a holding tank, the holding tank containing the blackwater treatment composition;

a pump in fluid communication with the holding tank;

a hose in fluid communication with the pump for dispensing the treatment composition; and a control system in direct or remote communication with the pump;

wherein the mobile treatment apparatus is adapted to dispense the treatment composition into the toilet.

26. A method for removing and preventing buildup of blackwater deposit in a blackwater collection or treatment system, the method comprising:

contacting at least a portion of the black water collection system with a concentrated blackwater deposit treatment composition comprising:

in the range of about 10 to about 75 wt. % of acidic solubilizing agent;

in the range of about 1 to about 40 wt. % of nonionic wetting agent;

corrosion inhibitor in an amount sufficient to prevent corrosion of the blackwater collection or treatment system by more than about 250 mils per year according to ASTM Test Method #30; and a solvent/carrier medium;

diluting the concentrated blackwater deposit treatment composition to a use treatment composition; and removing at least a portion of the use treatment composition from the portion of the blackwater collection system.

27. The method of claim 26, wherein prior to the removing step, further including the step of allowing the use treatment composition to contact the portion of the blackwater collection system for a contact time sufficient to dissolve blackwater deposit from the collection system into the treatment composition.

28. The method of claim 26, wherein the diluted use treatment composition comprises:

in the range of about 2 to about 15 wt. % of acidic solubilizing agent;

in the range of about 0.2 to about 8 wt. % of nonionic wetting agent;

corrosion inhibitor in an amount sufficient to prevent corrosion of the blackwater collection or treatment system by more than about 250 mils per year according to ASTM Test Method #30; and a solvent/carrier medium.

29. A composition for use in removing and preventing buildup of blackwater deposit in a blackwater collection or treatment system, the composition comprising:

in the range of about 2 to about 15 wt. % of acidic solubilizing agent comprising hydroxyacetic acid and sulfamic acid;

in the range of about 0.2 to about 8 wt. % of nonionic wetting agent;

corrosion inhibitor in an amount sufficient to prevent corrosion of the blackwater collection or treatment system by more than about 250 mils per year according to ASTM Test Method #30; and a solvent/carrier medium.

30. A method for removing and preventing buildup of blackwater deposit in a blackwater collection or treatment system, the method comprising:

contacting at least a portion of the blackwater collection system with a blackwater deposit treatment composition, the treatment composition comprising:

about 2 to about 15 wt. % of acidic solubilizing agent;

about 0.2 to about 8 wt. % of wetting agent; and a solvent/carrier medium; and removing at least a portion of the treatment composition from the portion of the blackwater collection system.

* * * * *